United States Patent Office 2,951,016
Patented Aug. 30, 1960

2,951,016
PROCESS FOR THE MANUFACTURE OF Δ<sup>1,4</sup>-STEROIDS

William Charney, Bloomfield, N.J., assignor to Schering Corporation, Bloomfield, N.J., a corporation of New Jersey No Drawing. Filed May 10, 1955, Ser. No. 507,469

13 Claims. (Cl. 195—51)

The present invention relates to the manufacture of 1,4-pregnadiene-17α,21-diol-3,11,20-trione (1 - dehydrocortisone or prednisone) and 1,4-pregnadiene-11β,17α,21-triol-3,20-dione (1-dehydro-hydrocortisone or prednisolone) and their esters.

More specifically, the invention relates to a process for the introduction of a Δ$^1$-double bond into the nuclei of cortisone, hydrocortisone and their esters, by subjecting such compounds to the action of a microbiological culture or to the separated enzymes of such culture.

I have found that fungi and molds belonging to the family Tuberculariaceae of the order Mobiliales and molds of the families Mycobacteriaceae, Actinomycetaceae and Streptomycetaceae of the order Actinomycetales, can, under suitable cultural conditions, effect dehydrogenation of cortisone, hydrocortisone, and their esters without scission or degradation of the side chain, opening up of the D ring, or other degradative action to produce compounds of the general formula:

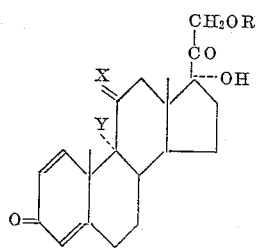

wherein:

R is a pharmaceutically acceptable acyl group, preferably that of a lower alkanoic acid, like acetyl, propionyl and butyryl, although substituted alkanoyl groups and aroyl groups, like cyclopentylacetyl, cyclopentylpropionyl, cyclohexylacetyl, dichloroacetyl, and benzoyl are not excluded; and
X is =O or

and Y is H, F, Cl, or Br.

Of the genera included within the family Tuberculariaceae, I prefer to employ members of the genera Tubercularia, Volutella, and Fusarium. I have obtained satisfactory results with the species included in the genus Fusarium, namely, *F. oxysporum* (A.T.C.C. 7601), *F. bulbigenum* (A.T.C.C. 7618), *F. lini* (A.T.C.C. 9593), and *F. zonatum* (A.T.C.C. 7628).

Of the family Streptomycetaceae of the order Actinomycetales, I prefer to employ the species included under the genus Streptomyces, namely *S. olivochromogenus* (A.T.C.C. 3336), *S. antibioticus* (A.T.C.C. 8663), *S. olivaceous* (A.T.C.C. 3335), and *S. bobiliae* (A.T.C.C. 3310).

The specific organisms of the above-named family Tuberculariaceae and of the order Actinomycetales are those having a dehydrogenating action, and I found that such dehydrogenation occurs also on 10,13-dimethyl steroids having a double bond attached to the 5-carbon. The dehydrogenating action occurs also on a 3-hydroxyl group, resulting in the production of a 3-keto group, so that there may be employed in place of cortisone, hydrocortisone and their esters, also their 3-hydroxy-Δ$^5$-analogues. The starting compounds employed in my improved process accordingly fall within the following general formula:

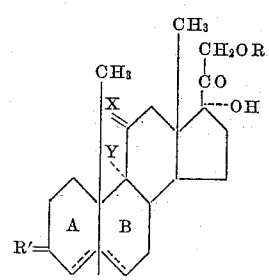

wherein R is an acyl group such as one of those named hereinabove; R' is a member of the group consisting of

and O; while X is a member of the group consisting of O and

and Y is hydrogen fluorine, chlorine or bromine, but preferably fluorine (when other than hydrogen), the dotted lines in the A and B rings indicating the alternative positions of the double bond, being in the 4,5-position when R' is O, and being in the 5,6-position when R' is

In place of a culture of the microörganism, there may be employed the separated enzymatic material, and in the further description hereinafter and in the claims it is to be understood that such separated extract may be employed in place of the culture as an equivalent thereof.

In place of Compound F (4-pregnene-11β,17α,21-triol-3,20-dione) and its esters and the 9α-halogeno derivatives of these compounds, there may be employed the corresponding 11α-hydroxy compound (epi-F) and its analogous derivatives, the resulting Δ$^1$-derivatives of these 11α-hydroxy compounds being convertible into the corresponding 11-keto compounds by mild oxidation, as with chromium trioxide in pyridine at room or below room temperature.

It will thus be seen that the process of the present invention effects the introduction of a Δ$^1$-double bond into the A-ring, and also oxidation of a 3-hydroxyl when present, without the simultaneous degradation of the side chain or opening up of the D-ring, or reduction of the 20-keto group (as will be evident from the formula of the final products) so that a simple and efficient process is provided for the conversion of the 4-pregnenes into the corresponding 1,4-pregnadienes which have been found to have a more potent adrenocorticoid and particularly a superior anti-arthritic activity than the corresponding 4-pregnenes.

The dehydrogenating action of the above-named microörganisms may be accompanied by an ester-hydrolyzing action if the steroid is maintained in contact with the culture for a sufficiently long period of time so that in place of 3-hydroxy compounds there may be employed also the corresponding 3-esters, as of the acyl groups above mentioned.

To obtain a desirable growth of the above-named organism for the process of this invention, a suitable nutrient medium is prepared containing carbohydrate, organic nitrogen, cofactors, and inorganic salts. It is possible to omit the use of carbohydrate without completely impairing the growth of the organism. The steroid compound as a solid or dissolved or suspended in ethanol, acetone or any other water-miscible solvent which is non-toxic toward the organism (in the low concentration employed), is added to the cultivated microörganism in a broth medium under sterile conditions. This culture is then shaken, aerated, or simultaneously aerated and agitated, in order to enhance the growth of the fungus or mold and the biochemical conversion of the steroid substrate. The steroid may be added to the broth medium and then inoculated with the bacterium, or the cultivated microörganism in broth medium may be added to the steroid. In certain cases, depending on the conditions of the reaction medium it may be more desirable to obtain optimum growth of the microörganism before the addition of the steriod. Alternatively, and as above indicated, enzyme preparations obtained in known manner from cultures of the fungus or mold may be used for carrying out the process.

A useful method for carrying out the process is the cultivation of the fungus or mold on a suitable nutrient medium under aerobic conditions. After cultivation of the microörganism, the cell mass may be harvested by centrifuging the nutrient broth, decanting the supernatant liquid and suspending the cell mass in saline. A suitable volume of the cell suspension is then seeded into a desirable nutrient medium for supporting growth of the microörganism. The nutrient medium employed may be a yeast extract (Difco), casein hydrolysate (N-Z-Amine) (Type B Sheffield), corn steep liquor, water extract of soybean oil meal, lactalbumin hydrolysate (Edamine-Sheffield Enzymatic), fish solubles, and the like.

Inorganic salts are desirable to maintain a pH level in the reaction medium of between 6.8 and 7.2. However, the use of inorganic salts for buffering the reaction mixtures may be omitted. The omission or inorganic salts causes the pH to rise from an initial value of 6.8 to about 7.7-8. This, however, will still permit the formation of the desired steroidal end products. The optimum temperature for growth of the selected microörganism is 37° C. but the temperatures may vary between 25° and 37°, and even between 20° and 40° C. The time of reaction may vary from as little as 3 hours to as much as 48 hours or more. The length of time which is employed will depend on the steroid which is being transformed. As already stated, any water miscible, non-toxic (to the organism) solvent may be employed to dissolve or suspend the steriod. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the oxidation or dehydrogenation process, which may be accompanied by partial or complete hydrolysis when mono- or poly-esters are used, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloro-ethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. Simple recrystallizations from a suitable solvent or solvent mixture, such as acetone, methylene chloride, ethanol, acetone-hexane, methylene chloride-hexane, etc., affords the desired dienone in excellent yield and high state of purity.

While the lower alkanoic esters are generally preferred, and particularly the acetates, as above indicated, it will be understood that the specific character of the ester is not controlling in my process and that other esters, both of organic and inorganic acids may be employed, such as cyclopentyl and cyclohexyl acetates, propionates and butyrates, and also the phosphates, polyphosphates and sulfates, it being necessary only that the esters be non-toxic toward the microörganism. The hydroxylated products of my process can, if desired, be converted into their corresponding esters by known procedures, for example, into their lower alkanoic and particularly their acteic acid esters.

The fish solubles referred to hereinabove are presently available commercially as an extract of herring, menhaden, and various mixtures thereof, which has been subjected to an enzymatic hydrolysis. This material can be added directly to the culture broth for supplying the nutrient material. Where fish solubles (50% solid content) are available which have not been subjected to enzymatic hydrolysis, such extracts should be diluted with water and steamed for about 10 minutes at 90° C., followed by filtration, preferably with the aid of Filter-Cel.

The invention will be described in further detail in the following examples which are presented by way of illustration only and not as indicating the scope of the invention.

*Example 1*

A culture of *Fusariumoxy sporum* (A.T.C.C. 7601) is grown on potato dextrose agar at 26° C. until well sporolated. A spore suspension is then prepared and used as hereinafter described.

A fermentation medium is prepared having the following composition:

|   | Gm. |
|---|---|
| Condensed fish solubles | 10 |
| Cerelose | 0.5 |
| Tap water to 1 liter. | |

The pH is adjusted to 6.5

Ten 100 ml. aliquots of this culture medium are dispensed into 300 ml. Erlenmeyer flasks and the open flasks autoclaved for 15 minutes at 15 lbs. steam pressure. After cooling, the flasks are inoculated under sterile conditions with 1 ml. of the spore suspension of *Fusarium oxysporum*. The flasks are then placed on a rotary shaker, set at 180 revolutions per minute, and incubated at 25° C. for 48 hours (or until abundant growth of the fungus is observed). At the end of this period, 50 mg. of Compound E (cortisone) dissolved in 1 ml. methanol is aseptically added to each flask. The cultures are shaken for an additional 48 hours, after which time all ten flasks are pooled. The mycelium is removed by filtration and extracted twice with about 1.5 times its volume of acetone. The acetone extracts are added to the filtrate. The mycelium is then extracted with about 1.5 times its volume of chloroform (about 500 ml.), and the filtrates are combined, while the mycelium is discarded.

The combined filtrates are then extracted three times with chloroform, using equal volumes of the solvent, each equal to the volume of the mixture. The chloroform extracts are dried over anhydrous sodium sulfate and evaporated to dryness. A crude product weighing 520 mg. (theoretical recovery 497 mg.) is obtained.

The crude residue is chromatographed on an alumina column with a recovery of 320 mg. (64% yield) of Compound E diene (1,4-pregnadiene-17α,21-diol-3,11,20-trione), as determined by paper chromatography, by polarographic and infra-red spectral analysis, and by its melting point (229-231° C., with decomposition).

Example 2

A culture of *Streptomyces olivochromogenus* (A.T.C.C. 3336) is grown on a 1% yeast extract-dextrose agar at 26° C. until well sporolated. A spore suspension is then prepared and used as the inoculum for a fermentation medium of the following composition:

| | Percent |
|---|---|
| N-Z amine (Protein hydrolysate, Sheffield Chemical Company, Norwich, New York | 2.5 |
| $K_2HPO_4$ | 0.2 |
| $MgSO_4$ | 0.05 |
| Water to 1 liter. | |

The pH is adjusted to 6.8.

Ten 100 ml. aliquots of this medium are dispensed into 300 ml. Erlenmeyer flasks and the open flasks autoclaved for 15 minutes at 15 lbs. steam pressure.

After cooling, the flasks are inoculated with 1 ml. of the spore suspension of *Streptomyces olivochromogenus*. The flasks are then placed on a rotary shaker, set at 180 revolutions per minute, and incubated at 28° C. for 48 hours (or until abundant growth of the fungus is observed). At that time 50 mg. of cortisone dissolved in 1 ml. methanol are aseptically added to each flask. The cultures are shaken for an additional 24 hours, after which time all ten flasks are pooled. The mycelium is removed by filtration and extracted twice with acetone. The acetone extracts are added to the filtrate. The mycelium is then extracted with chloroform, the filtrates combined and the mycelium discarded.

The combined filtrates are extracted three times with chloroform, using equal volumes of the solvent equal to the volume of the mixture. The chloroform extracts are dried over anhydrous sodium sulfate and evaporated to dryness. There is obtained in this manner a crude steroid weighing 535 mg. (theoretical recovery 497 mg.) is obtained.

The crude residue is chromatographed on an alumina column and 260 mg. (52% yield) of a product identified as Compound E, diene is recovered.

Under identical conditions as described in Examples 1 and 2, Compound F (hydrocortisone) is converted into its corresponding diene (1,4-pregnadiene-11β,17α,21-triol-3,20-diene).

I claim:

1. Process for the manufacture of $\Delta^{1,4}$-pregnadiene-9α-Y-11-X-17α-ol-21-OR-3,20-diones which comprises subjecting a pregnene compound of the formula

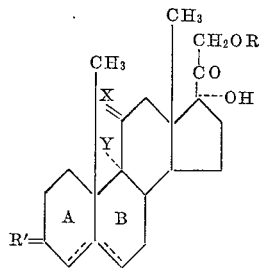

wherein R is a member of the group consisting of H and lower alkanoyl, R' is a member of the group consisting of O and

X is a member of the group consisting of O,

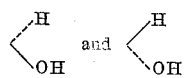

and Y is a member of the group consisting of hydrogen, fluorine, chlorine and bromine, the dotted lines in rings A and B indicating the position of the double bond, to the action of a culture of a dehydrogenating microorganisms of the group consisting of *F. oxysporum, F. bulbigenum, F. lini, F. zonatum, S. olivochromogenus, S. antibioticus, S. olivaceous,* and *S. bobiliae*.

2. Process according to claim 1, wherein the starting compound is cortisone and the isolated product is 1-dehydrocortisone.

3. Process according to claim 1, wherein the starting compound is hydrocortisone and the isolated product is 1-dehydro-hydrocortisone.

4. Process according to claim 1, wherein the starting compound is epi-hydrocortisone and the isolated product is 1-dehydro-epi-hydrocortisone.

5. Process according to claim 1, wherein the starting compound is 5-pregnene-3,11β,17α,21-tetrol-20-one and the isolated product is 1-dehydro-hydrocortisone.

6. Process according to claim 1, wherein the starting compound is 5-pregnene-3,17α,21-triol-11,20-dione and the isolated product is 1-dehydrocortisone.

7. Process according to claim 1, wherein the microörganism is *Fusarium oxysporum*.

8. Process according to claim 1, wherein the microörganism is *Fusarium bulbigenum*.

9. Process according to claim 1, wherein the microörganism is *Fusarium lini*.

10. Process according to claim 1, wherein the microörganism is *Fusarium zonatum*.

11. Process according to claim 1, wherein the microörganism is *Streptomyces olivochromogenus*.

12. Process for the manufacture of 1,4-pregnadiene-17α,21-diol-3,11,20-trione, which comprises bringing cortisone into contact with a culture of *Fusarium oxysporum* under aerobic conditions, terminating the reaction after the Δ¹-double bond has been introduced but before the 20-carbonyl group has been reduced or the 17-side chain degraded, and isolating the formed 1,4-pregnadiene-17α,21-diol-3,11,20-trione from the reaction mixture.

13. Process for the manufacture of 1,4-pregnadiene-17α,21-diol-3,11,20-trione, which comprises bringing cortisone into contact with a culture of *Streptomyces olivochromogenus* under aerobic conditions, terminating the reaction after the Δ¹-double bond has been introduced but before the 20-carbonyl group has been reduced or the 17-side chain degraded, and isolating the formed 1,4-pregnadiene-17α,21-diol-3,11,20-trione from the reaction mixture.

References Cited in the file of this patent

UNITED STATES PATENTS

| 2,602,769 | Murray et al. | July 8, 1952 |
| 2,649,401 | Haines | Aug. 18, 1953 |
| 2,756,179 | Fried et al. | July 24, 1956 |
| 2,793,164 | Fried et al. | May 21, 1957 |

OTHER REFERENCES

Vischer et al.: Experimentia, IX, 10, 1953, pp. 371–372. J.A.C.S., 75, Nov. 20, 1953, pp. 5765–5765.

Vischer et al.: Helvetica Chimica Acta, 38, May 2, 1955, pp. 835 to 840.